United States Patent [19]

Birjukov et al.

[11] Patent Number: 4,699,364
[45] Date of Patent: Oct. 13, 1987

[54] VERSATILE KNOCKDOWN FIXTURE

[75] Inventors: Vasily D. Birjukov; Vladimir V. Kolganenko; Vsevolod V. Tsaregradsky; Vladimir G. Darovsky; Boris K. Titov, all of Kharkov, U.S.S.R.

[73] Assignee: Mezhotraslevoi Golovnoi Konstruktorsko-Tekhnologichesky Institut Tekhnologicheskoi Osnastki, Kharkov, U.S.S.R.

[21] Appl. No.: 854,594

[22] Filed: Apr. 22, 1986

[51] Int. Cl.$^4$ ............................................. B23Q 1/06
[52] U.S. Cl. .................................. 269/303; 269/309; 269/315
[58] Field of Search ............... 269/309, 310, 303, 315, 269/296; 33/180 R; 403/13, 14, 356; 198/345; 29/464

[56] References Cited

U.S. PATENT DOCUMENTS

| 2,638,676 | 5/1953 | Callahan | 33/180 R |
|---|---|---|---|
| 3,032,333 | 5/1962 | Fuller | 269/309 |
| 4,070,120 | 1/1978 | Bald et al. | 403/13 |
| 4,360,974 | 11/1982 | Cuissart | 33/180 R |
| 4,390,172 | 6/1983 | Gotman | 33/180 R |
| 4,586,702 | 5/1986 | Chambers | 269/310 |
| 4,610,020 | 9/1986 | Fiandra | 269/309 |

FOREIGN PATENT DOCUMENTS 645957 1/1980 Switzerland .................. 403/13
795861 8/1925 U.S.S.R. .

OTHER PUBLICATIONS

"Spravochnik Metallista," vol. 1, Moscow, 1957, p. 258.

Primary Examiner—Robert C. Watson
Attorney, Agent, or Firm—Fleit, Jacobson, Cohn & Price

[57] ABSTRACT

A versatile knockdown fixture includes datum members each of which is provided with at least two intersecting grooves, which are located on the side of mating faces and form, after the mating faces have been joined, unified spaces. At the intersection of the grooves, there is provided an annular recess where there is a sleeve with radial holes in its side. A cylindrical key is secured by an indent made at one of its ends in each hole, which key fits the space with a guaranteed interference. Within the area of contact with the key, the groove has a trapezoid cross section and a depth greater than one half of the diameter of the key.

1 Claim, 2 Drawing Figures

VERSATILE KNOCKDOWN FIXTURE

FIELD OF THE INVENTION

The present invention relates to mechanical engineering and has specific reference to a versatile knockdown fixture.

The disclosed fixture will be advantageous as a means for orientating and fixing workpieces for machining.

BACKGROUND OF THE INVENTION

There is known a fixture for positioning two parts (cf. laid-open Application of the Federal Republic of Germany No. 2,537,146; F 16 B 5/02) wherein precision taper holes containing locating members in the form of centering balls are provided on the side of mating faces.

The known fixture ensures stable positioning of both parts with respect to each other and a rigid joint between them, which results due to an interference set up between said ball and the walls of taper holes by means of fasteners.

However, the load sustained by every locating member of the known fixture is concentrated at a point or along a line of a length equalling the width of the area of contact between the ball and the walls of a taper hole. As a result, the rigidity of the joints is low.

Moreover, taper holes in parts with very hard mating faces must be finished on jig grinders capable of machining only one hole at a time. This prevents several operations being performed on a workpiece at a given time and consequently increases labour requirements for part manufacturing.

When balls are used as locating members, no joint making various angles with the horizontal can be assembled without recourse to additional contrivances, and in the process of disassembly on the horizontal plane it is difficult to remove the ball from the taper hole for the ball centre is located in this case contiguously with a mating face of a datum member. The cleaning of taper holes from dust, chips and coolant is a problem as well.

Also known are assorted datum and locating members of versatile fixtures with a variable setup (cf. USSR Inventor's Certificate No. 795,861; B23 Q3/00), a salient feature of which is datum members each provided with a hole for a fastener and with at least two intersecting grooves which are located in a side with mating faces and form, after the mating faces have been joined, unified spaces wherein which one contained locating members in the form of prismatic keys. The grooves have a stepped outline and the pitch of the grooves equals their width. The prismatic keys are also of a stepped configuration, one step being off-set relative to the base of another step, and are held fast to the datum members by screws.

An assembling of the known fixture is a time-consuming job, for every key is held fast by a separate screw. The known fixture is also labour consuming in manufacture, for tapped holes must be made in the datum members to receive the screws holding down the keys. Unavoidable clearances exist between the keys and the walls of the grooves, to which the datum members can be displaced, depriving the workpiece of firm positioning.

SUMMARY OF THE INVENTION

An object of the present invention is to provide a versatile knockdown fixture capable of positioning a workpiece firmly for machining.

Another object of the present invention is to provide a fixture of a design speeding up the assembly thereof.

These objects are materialized by the provision of a versatile knock-down fixture incorporating datum members each of which is provided with a hole receiving a fastener and with at least two intersecting grooves located on the side of mating faces and forming, after the mating faces have been joined, unified spaces containing locating members in the form of keys. According to the invention, an annular recess is provided at the intersection of the grooves, which contains a sleeve with radial holes in its sides into which are fitted the cylindrical keys which are each fixed in place by an indent at an end and arranged in the corresponding space with a guaranteed interference. Each of the keys is fitted in contact with a groove having a trapezoid cross section having a depth greater than one half of the diameter of the key.

The grooves of trapezoid cross section in conjunction with the cylindrical keys fitting into its groove, form a clearance-free rigid joint between the datum members which is conducive to a firm positioning of the workpiece. The manner in which a given number of keys is fixed in the sleeve speeds up the assembling of the disclosed fixture.

BRIEF DESCRIPTION OF THE DRAWINGS

The present invention will now be described by way of an example with reference to the accompanying drawings, in which.

DETAILED DESCRIPTION OF THE INVENTION

Figure 1:
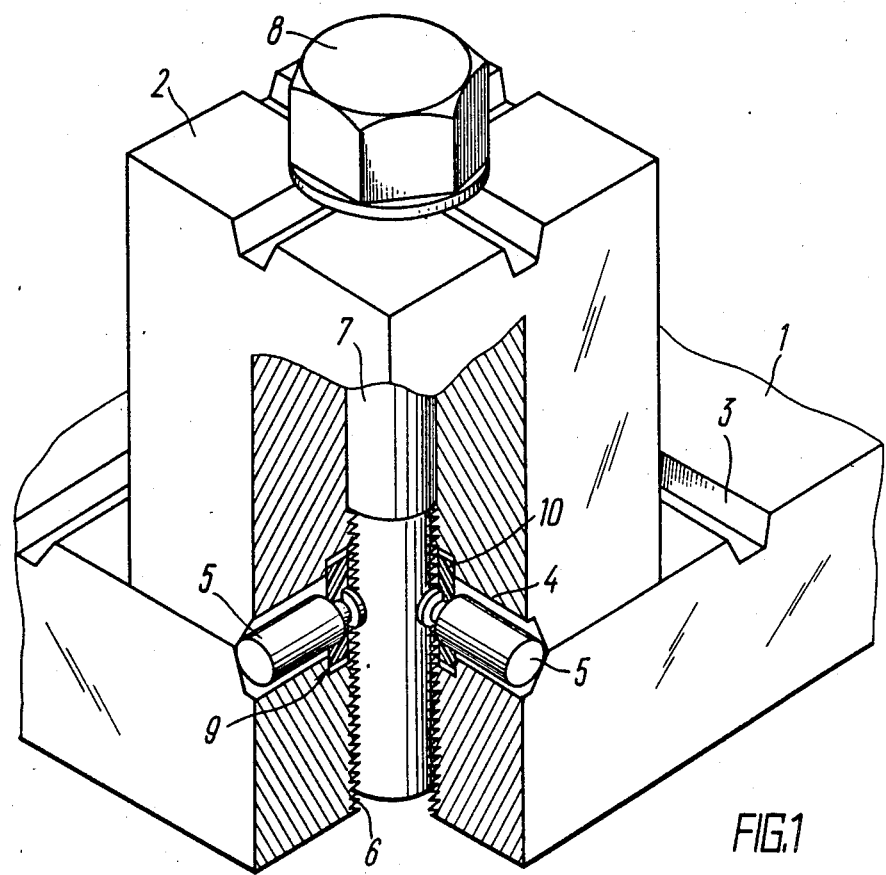
FIG. 1 is an axonometric general view, partly cut away, of a versatile knockdown fixture.

Referring to FIG. 1, a versatile knockdown fixture incorporates two datum members 1,2 having each on the side of mating faces four intersecting grooves 3, two of them forming unified spaces 4 when the mating faces are put together.

The grooves 3 are arranged to intersect one another so that their planes of symmetry form either acute angles or right angles with each other, depending on the function of the datum members 1,2 and the conditions under which these are bound to operate. To speed up the assembling of the fixture, a coordinate grid of grooves may be provided on the side of the mating faces of the datum members.

Every two grooves 3 form a space 4 with a guaranteed interference having a locating member in the form of a cylindrical key 5. Holes 6,7 are provided in the datum members 1,2 to receive a fastener 8.

Figure 2:
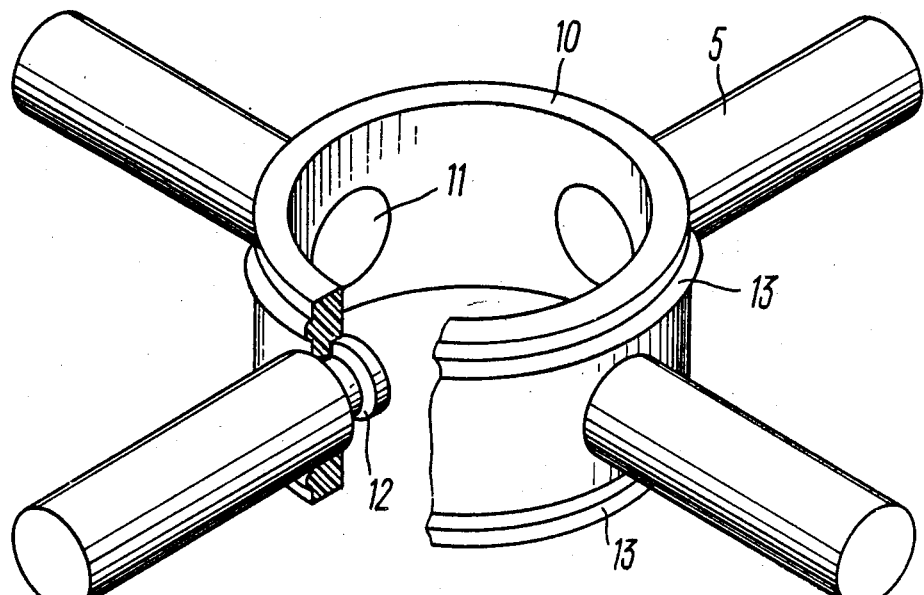
FIG. 2 is an axonometric view, partly cut away, of a sleeve with cylindrical keys, which is an element of the fixture.

An annular recess 9 is provided at the intersection of the grooves 3 and contained therein is a sleeve 10 having radial holes 11 (FIG. 2). The cylindrical keys 5 are held fast in the holes 11 by means of indents 12 provided at their ends.

The material of the sleeve 10 is of a resilient type and may be, for example, plastic or spring sheet steel.

The sleeve 10 can be provided with collars 13 which would prevent it from falling loose out of the recess 9. No collars 13 are needed if the recess 9 is machined to a tolerance keeping the sleeve 10 firm in its place.

The annular recess 9 (FIG. 1) can be located either coaxially with the holes 6,7 or with an offset, depending on design considerations.

The cross-sectional area of each groove 3 within the zone of its contact with the cylindrical key 5 is a trapezoid and the depth of the groove 3, which brings about the effect of centering of the key 5, is greater than a half-diameter of this key.

Practical experience goes to show that hardness of the mating faces is the main factor in securing the dimensional accuracy of the datum members 1, 2 through years of service. To meet this requirement, it is advisable to finish the grooves finely with a form-fitting grinding tool on a multipurpose machine or one specially adapted for the job. Several operations can be performed on each datum member at a time to speed up the grinding of the grooves compared with the machining of the taper holes according to the laid-open Application of the Federal Republic of Germany No. 2,537,146 referred to hereinabove. It will be noted that every groove in the present fixture is substituted for a number of holes which each must be machined individually to given dimensions within given tolerances.

The procedure of assembling the present versatile knockdown fixture is as follows.

The sleeve 10 with the cylindrical keys 5 fitted thereinto in advanced so as to coincide directionally with the grooves 3 inserted into the recess 9 of the datum member 1. On fitting the datum member 2 into its place so that its grooves 3 are parallel to the cylindrical keys 5, the fastener 8 contained in the holes 6, 7 is tightened home. The force set up in tightening brings about contact deformation of the walls of the grooves 3 and deforms the keys 5 as well, so that a guaranteed interference exists along the keys 5 in the spaces 4.

In the present fixture for workpiece positioning the cutting force coming in the datum members 1,2 is transmitted to the keys 5 within narrow areas of contact of a length equalling that of the keys 5 with the result that a rigid joint is obtained between the datum members. The rigid joint facilitates firm positioning of the workpiece, which is conducive to precise machining thereof.

The grooves of the present fixture are readily accessible and can be easily cleaned of dust, chips and coolant without any special means. No difficulties are experienced in fitting and taking down the datum elements which join each other along a plane making various angles with the horizontal. Used to that end is a sleeve holding a requisite number of keys.

In addition, a sleeve of the kind provided in the present fixture, i.e. one with cylindrical keys fitting thereinto, can find application as an aid in putting together hardened machinery components, particularly those which are frequently taken apart and must be reassembled with a positioning accuracy of a high order.

What is claimed is:

1. A versatile knockdown fixture comprising:
  datum members with mating faces;
  at least two intersecting grooves made in the datum members on the side of the mating faces and forming unified spaces after said mating faces have been joined;
  an annular recess provided at the intersection of the grooves;
  a sleeve having radial holes in its side and arranged in the annular recess;
  cylindrical keys, each having an indent at one of its ends, secured by means of said indent in said radial hole and arranged in one of said unified spaces with a guaranteed interference, said groove within the area of contact with said key being of a trapezoid cross section and having a depth greater than one half of the diameter of said key.

* * * * *